INVENTORS
WILLIAM M. HUTCHINSON
DONALD L. MARTIN
OSCAR P. OLSON
BY Moody and Phillion
ATTORNEYS

United States Patent Office 3,509,279
Patented Apr. 28, 1970

3,509,279
AM DATA DETECTOR WITH REFERENCE LEVEL RESPONSIVE TO INPUT AND DETECTED DATA TO PRODUCE COMPARISON SIGNAL
Donald L. Martin, Santa Ana, and Oscar P. Olson and William M. Hutchinson, Newport Beach, Calif., assignors to Collins Radio Company, Cedar Rapids, Iowa, a corporation of Iowa
Filed May 22, 1967, Ser. No. 640,179
Int. Cl. H04l 13/18, 15/26
U.S. Cl. 178—88   20 Claims

ABSTRACT OF THE DISCLOSURE

A received two-level input signal $V_{in}$ is modified, under control of decoding means, to produce a single level signal whose amplitude bears a fixed, known relationship to a nominal D-C reference signal. The actual, existing reference signal $V_{ref}$ is continuously compared with the modified single level input signal through integrating means to continuously correct the level of $V_{ref}$ towards the ideal reference voltage which lies midway between the two levels of $V_{in}$, and changes as the average level of $V_{in}$.

---

This invention relates generally to means for distinguishing between the two amplitude levels of a two-level D-C signal and, more particularly, to means for developing a D-C reference signal which lies substantially midway between the two levels of the two-level signal.

The use of two-level signals for the transmission of information is widespread in modern communication systems. For example, in each bit period of a time synchronous system, one of the two levels can represent a binary "1" and the other level a binary "0," or in the case of Teletype code one of the two levels can represent a mark and the other a space.

In any system employing a two-level signal, however, it is necessary at the receiver to distinguish between the two levels in order to separate the "1's" from the "0's" or the marks from the spaces. One of the more common ways of distinguishing between the two levels is by means of reference signal whose amplitude lies midway between the amplitudes of the two levels so as to be less than one level but greater than the other. A comparison of the amplitudes of the received signal and the reference signal will then determine whether the received bit is a "1" or a "0."

One difficulty presented by the use of such a reference signal lies in the fact that the average intensity of the received signal can vary over a considerable range. Consequently, if the amplitude of the reference signal remains constant, the larger level of the received signal can become less than the reference signal. Conversely, if the average intensity of the received signal increases, the lower level of the received signal can become greater than the reference signal. In either case the reference signal no longer distinguishes between the two levels.

It is a primary object of the present invention to distinguish between the two levels of a two-level signal by a reference signal whose magnitude varies as the average magnitude of the two-level signal varies so that the magnitude of the reference signal always remains between the two levels of the received signal.

A second purpose of the invention is to provide an AM data detector capable of distinguishing the two levels of a two-level signal over a relatively wide range of average values of the two-level signal.

A third object of the invention is the improvement of the detection of two-level signals with the aid of a reference voltage, generally.

In accordance with the invention there is provided an amplitude comparing circuit means such as a differential amplifier which functions to compare the voltage level of the input signal and the reference signal, assumed to already exist, and to produce an output signal lasting for substantially a full bit period and whose polarity indicates whether the level of the received input signal is greater or less than that of the reference signal.

A circuit designated generally as a polarity decision circuit and which can be a simple flip-flop circuit, responds to samplings of the output of the amplitude comparing circuit to assume one of two states. Such samplings occur once each bit period of the input signal. The output of the polarity decision circuit can be employed to operate one or more flip-flop circuits as will be discussed later in the specification.

To establish a continuously corrected reference voltage, there is provided a reference voltage correcting circuit which includes an amplitude modulating circuit responsive to the incoming two-level input signal and also to the output voltage of the polarity decision circuit to change both levels of the two-level input signal to a common amplitude. Such common amplitude bears a fixed relationship to the two levels of the input signal as the said two levels vary in accordance with changing attenuation characteristics in the transmission media and with other factors. The said reference voltage correcting circuit means also includes a comparing circuit means for comparing the said common amplitude level of the input signal with the already established reference signal to determine in which direction the established reference signal must be changed to approach a new value in accordance with the changing value of said common amplitude level. The said correcting circuit means further includes an integrating circuit means which provides for a gradual change of the reference signal towards its new value, even in the event of large instantaneous changes of the input signal.

It is necessary to determine whether the nature of the received bit is a "1" or a "0" before the direction of correction of the reference voltage correcting circuit can be determined. Since sampling of the output of the amplitude comparing circuit at the beginning of the bit period presents a substantial possibility of an incorrect sampling, such sampling is delayed until after the incoming bit has been firmly established. To provide for such sampling delay a gating means is provided between the output of the amplitude comparing circuit and the polarity decision circuit. Such gating means is responsive to a sampling signal to supply the output of the voltage comparing circuit to the polarity decision circuit a predetermined time interval after the beginning of each bit.

Since adjustment of the reference voltage is based on a correct recognition of the nature of the received bit, it is possible for the system to become hung up. More specifically, if for some reason the reference voltage suddenly becomes greater than the upper level of the input signal, then both levels of the input signal would appear to the reference signal to be lower levels and the reference signal would be corrected to an increasingly larger value. To overcome such possibility of error, there is provided an override feature which is essentially a voltage transition detector circuit. Each time the level of the input signal increases by a predetermined minimum amount as, for example, 80% of its prior value, the transition detector circuit will function to override the polarity decision circuit and indicate to the system that a transition from the lower level to the upper level has occurred. The reference voltage will accordingly be adjusted as if an upper level had been received, even if the reference voltage at that time had a magnitude greater than said reference level. Thus, under such circumstances the reference voltage would be decreased towards its proper value.

The above-mentioned and other objects and features of the invention will be more fully understood from the following detailed description thereof when read in conjunction with the drawings in which.

Figure 1:
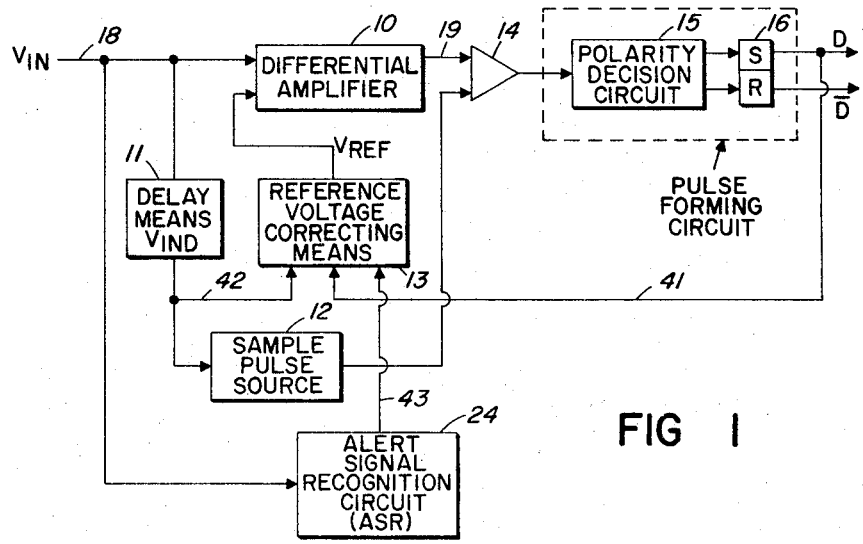
FIG. 1 is a block diagram of a simplified form of the invention.

Referring now to FIG. 1, the two-level input signal shown in FIG. 6A is supplied via input lead 18 to three circuits. Specifically, said input signal is supplied to differential amplifier 10, delay means 11, and alert signal recognition circuit 24.

Supplied to the other terminal of differential amplifier 10 is the output of the reference voltage correcting means 13. As discussed generally above, the reference voltage correcting means 13 functions to continually correct the reference voltage so that it remains substantially midway between the two levels of the two-level input signal as the average intensity of said input signal varies.

The differential amplifier 10 responds to the input signal $V_{in}$ and the reference voltage $V_{ref}$ to produce an output signal at its output terminal 19 having a polarity determined by the compartive amplitudes of the input signal and the reference voltage. Once each bit period the output of differential amplifier 10 is sampled by means of AND gate 14 and the output of sample pulse source 12. The polarity of such sampling its representative of the comparative magnitude of the input signal $V_{in}$ and the reference voltage $V_{ref}$. The polarity decision circuit 15 is responsive to the output signal from AND gate 14 to energize output flip-flop circuit 16 into one of its two states, depending upon the polarity of the signal from AND gate 14.

The reference voltage correcting means 13 is responsive to two input signals to produce the continually corrective reference voltage supplied to an input of differential amplifier 10. More specifically, reference correcting means 13 is responsive to input signal $V_{in}$, which is delayed for reasons to be discussed in detail later, through delay means 11. Such input signal can, of course, either be a high level or a low level input signal, representing a "1" or a "0," respectively. It is essential that the reference voltage correcting means know whether the received input signal is a high level or a low signal in order to properly correct the reference voltage.

More specifically, if the level of the received input signal is high, such fact must be known by the reference voltage correcting means to reduce it to the common level amplitude discussed above. Similarly, if the level of the received input signal is low, such fact must be known in order to increase its amplitude to said common amplitude level. Both the high level and the low level frames of the received input signal are properly modified to the common amplitude.

It is with respect to this common amplitude that the reference voltage is compared and corrected. To determine the level of the received input signal during each bit, the output of flip-flop 16 is examined. More specifically, flip-flop 16 is set in accordance with the nature of the received input signal. For example, if the received input signal during the particular bit sampled is a "1," the upper stage of flip-flop will be in its true state and represent a "1" output. On the other hand, if the received input signal is a "0" during the particular bit being sampled, the upper stage will be in its false condition and will represent a "0" output.

Thus the reference voltage correcting means 13 is instructed as to whether the received bit is a "1" or is a "0" via output lead 41 of flip-flop 16 and thereby functions to modify the received input signal from delay means 11 to the common amplitude level accordingly.

The reason for delay means 11 is as follows. It is dsirable that each bit being received be sampled sometime after the beginning of the bit period in order to avoid sampling during the transition period. Further, it is important that the received input signal be supplied to the reference voltage correcting means 13 at substantially the same time that the flip-flop 16 determines the nature of the incoming bit. Consequently, the sample pulse source 12 is shown as being energized by the output of delay means 11, with each of the sample pulses (FIG. 6C) occurring at the leading edge of each delayed bit frame (FIG. 6B). Such sample pulses open the gate 14 to sample the received input signal $V_{in}$ (FIG. 6A) after the beginning of each bit by a time interval determined by delay means 11. Flip-flop 16 is energized substantially coincidentally with the opening of gate 14 so that the reference voltage correcting 13 receives information from the flip-flop 16 as to the nature of the received bit at the same time that it receives the delayed bit from the output of delay means 11.

Reference is now made specifically to curves 6A, 6B, and 6C. Curve 6A represents the input signal supplied to input lead 18. In FIG. 6B there is shown the input waveform delayed by delay means 11 and supplied both to the reference voltage correcting means 13 and to sample pulse source 12. In curve 6c there is shown the sampling pulses generated by sample pulse source 12 and supplied to the input of AND gate 14. The output of the upper output lead D of the flip-flop 16 is also represented substantially by the waveform 6B.

In order to initially preset the reference voltage to its approximate desired value, an alert signal code is transmitted just before the transmission of the information data. The alert signal recognition circuit 24 is constructed to respond to the alert signal code to control the reference voltage correcting means 13 during the reception of the alert signal code. More specifically, the alert signal code contains a train of pulses of a known level equal to, for example, the upper level of the two-level input signal. The reference voltage correcting means 13 is constructed to be controlled by the output of the alert signal recognition circuit to establish the proper amplitude of the reference voltage by means of the known level of said train of pulses.

At the end of the alert signal code, the reference voltage correcting means 13 is removed from under the control of the alert signal recognition circuit means and subsequently will utilize the incoming data information to continuously update the amplitude of the reference voltage.

Further, as will be discussed later, the reference voltage correcting means 13 is constructed to change an internal RC time circuit while under control of the alert signal recognition circuit 24 to decrease the time ordinarily required to alter the amplitude of the desired reference voltage.

Thus, in summary, it can be seen the reference voltage correcting circuit 13 receives the actual amplitude of the received bit from the delay means 11, and from the output of flip-flop 13. It determines which level of the input signal is being received and consequently whether it should be increased or decreased to be modified to the common amplitude.

Figure 3:
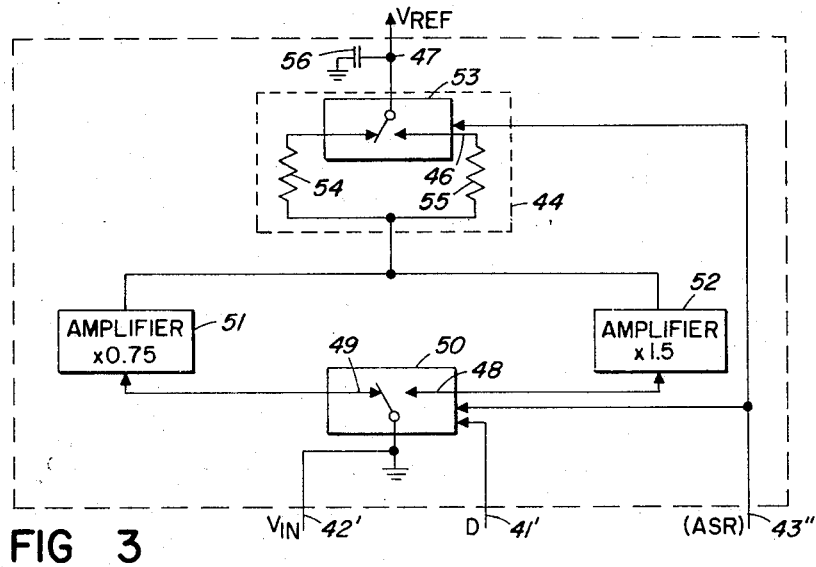
FIG. 3 shows an embodiment of a reference voltage correcting circuit to accommodate variations in the average level of the received input signal.
Figure 4:
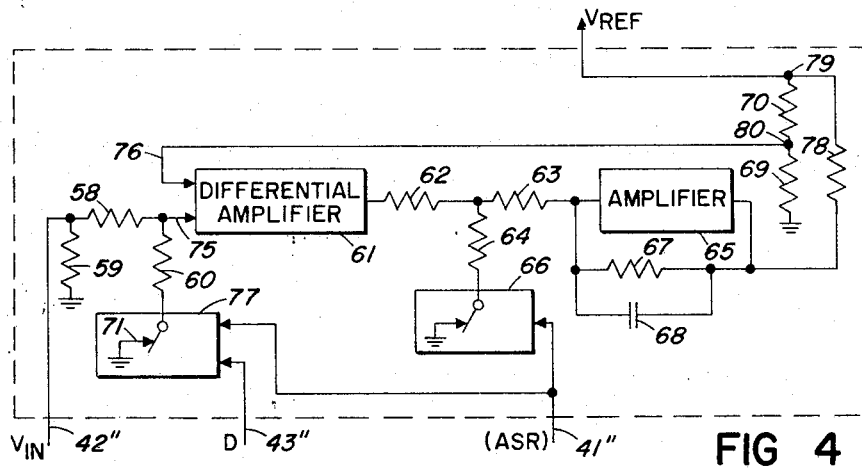
FIG. 4 is an alternative reference voltage correcting circuit.

In FIGS. 3 and 4 there are shown two alternative circuits which can be employed as the reference voltage correcting means 13 in FIG. 1. In FIG. 3 the delayed input signal is supplied via the input lead 42' to the armature of the double pole, double throw switch 50. The position of the armature of switch 50 is determined by the signal supplied via lead 41' from the output of flip-flop 16 of FIG. 1. More specifically, if the output of flip-flop 16 is a "1" then the armature of switch 50 (FIG. 3) makes with contact 49, so that the received binary bit "1," which is represented by the higher level of the two-level signal, is amplified by a factor of .75, as shown in block 51. It is to be noted that with ideal transmission characteristics, the amplitude of the higher level will be twice the amplitude of the lower level.

On the other hand, if the output of flip-flop 16 of FIG. 1 is a "0," representing reception of the lower level of the input signal, then the armature of switch 50 (FIG. 3) makes with contact 48 so that the delayed input signal is amplified by a factor of 1.5, as shown in block 52.

Thus, the received input signal, whether it is high level or low level, is always modified to a common amplitude level by the action of switch 50 and amplifiers 51 and 52. It is to be noted that while switch 50 of FIG. 3 is shown as a mechanical device, in actual practice it would preferably be an electronic type switch employing transistors, for example. Such switches are well known in the art and will not be described in detail herein.

The outputs of amplifiers 51 and 52 are connected in common to the circuit within the dotted block 44; said dotted block 44 is comprised of two resistors 54 and 55 in parallel and a double-pole, double-throw switch 53 whose armature position is controlled by the input from the alert signal recognition circuit 24 of FIG. 1 via lead input 43".

As discussed above, just before the reception of information, there is transmitted an alert signal code which is detected by the alert signal recognition circuit and which is designed to preset the reference voltage to a value near its desired value. In the circuit of FIG. 3 the alert signal code performs two functions. Firstly, it presets switch 50 to a desired position as, for example, with contact 49 made. Secondly, it presets switch 53 to a desired position, so that the output of amplifier 51 will flow through resistor 54 which is smaller than resistor 55, and which in conjunction with capacitor 56 provides the necessary short time constant for the initial presetting of the reference voltage $V_{ref}$.

It is to be noted that the reference voltage is the voltage at junction 47, which is the voltage created across capacitor 56, which in turn is part of an RC circuit comprised of capacitor 56 and either resistor 54 or resistor 55. Since resistor 54 is smaller than resistor 55, it forms a shorter time constant with capacitor 56. Such shorter time constant RC circuit is employed during the initial determination of the reference voltage. However, after the reference voltage has been initially preset and the alert signal recognition circuit 24 of FIG. 1 has been de-energized, the armature switch 53 makes with contact 46 so that the new RC time constant circuit contains the larger resistor 55 and the time constant is larger. The larger time constant provides for slower changes in the reference voltage with changes in the average value of the received input signal $V_{in}$.

Referring now to FIG. 4, there is shown another form of the reference voltage correcting means 13 of FIG. 1. In FIG. 4 the delayed reference voltage is supplied to input lead 42" across load resistor 59, and also through resistor 58 to input terminal 75 of differential amplifier 61.

During the high level periods of $V_{in}$, the armature of switch 77 makes with contact 71 which is connected to ground, and thereby divides the input voltage $V_{in}$ to one-half its received value. During the low level portions of $V_{in}$ the armature switch 77 breaks with contact 71 so that the full low level value of the input voltage is supplied to input lead 75 of differential amplifier 61.

The positioning of the armature of switch 77 is controlled by the output of the flip-flop 16 of FIG. 1, in the same manner that switch 50 of FIG. 3 is controlled thereby. Further, the switch 77, although shown as a mechanical switch, is in actual practice an electronic switch employing transistors, for example.

Thus the voltages actually supplied to input terminal 75 of differential amplifier 61 is substantially the same for both high and low levels of $V_{in}$ assuming a constant average intensity of $V_{in}$. The actual value of the voltage supplied to input terminal 75 of differential amplifier 61 will, of course, vary as the average value of $V_{in}$ varies. To the other input 76 of differential amplifier 61 is supplied a voltage which bears a fixed ratio to the amplitude of the actual reference voltage $V_{ref}$.

The actual reference voltage $V_{ref}$ is the voltage existing across the capacitor 68 and is obtained in the following manner. The output of amplifier 65 is supplied across a voltage divider consisting of resistors 78, 70, and 69 connected in series with taps 79 and 80 therein. The values of said resistors 78, 70, and 69 are selected such that when the reference voltage appearing at tap 79 and across the resistors 70 and 69 is exactly equal to the midpoint between the high and low levels of the input voltage at that instant of time, then the voltage appearing at tap 80 and across resistor 69, which is applied to input 76 of differential amplifier 61, is exactly equal to the modified voltage input supplied to differential amplifier on input lead 75.

If the voltage appearing at tap 80 and applied to input 76 of amplifier 61 is lower than the input voltage on input lead 75, then the output of differential amplifier 61, which is supplied to amplifier 65 through resistors 62 and 63, will be of such a polarity as to cause the output of amplifier 65 to increase, thus increasing the voltage at taps 79 and 80.

On the other hand, if the voltage supplied to input terminal 76 is greater than the input voltage supplied to input terminal 75, then the output of differential amplifier 61 is of such a polarity as to cause the output of amplifier 65 to decrease, thus decreasing the voltage at taps 79 and 80.

As discussed in connection with FIG. 1, it is not desirable that the output of amplifier 65 follow sudden changes in the average intensity of $V_{in}$. Only the long term change of the average intensity of $V_{in}$ should be reflected to any degree by the circuit.

To provide such a long term consideration of changes of $V_{in}$ there is provided an integrating circuit consisting of resistor 67 and capacitor 68 which are connected in parallel with amplifier 65. The time constant of said integrating circuit is long compared to the single frame time of the received signal. Thus, any sudden change in the average value of the input voltage will not be immediately reflected in $V_{ref}$, which is directly proportional to the voltage across capacitor 68. Only those changes in the average value of $V_{in}$ which are sustained over a predetermined number of frames, will cause substantial changes in the reference voltage $V_{ref}$.

As in the case of FIG. 3, it is desirable that the reference voltage $V_{ref}$ assume its desired value quickly during the period of reception of the alert signal code when the alert signal recognition circuit 24 of FIG. 1 is energized. To provide for such initial determination of the reference voltage, the time constant of the circuit of FIG. 4 is decreased during such initial period. Such decrease in time constant is accomplished by switch 66 and resistor 64. More specifically, the alert signal recognition circuit 24 (FIG. 1) when energized, functions to close the armature of switch 66 to contact 71 connected to ground, thereby placing resistor 64 in parallel with resistors 62 and 63 and decreasing the time constant of the entire system. After the energization of the alert signal recognition circuit 24, the armature switch 66 is opened and the time constant is increased to permit a slower change of the reference voltage as the average intensity of $V_{in}$ changes.

Figure 2:
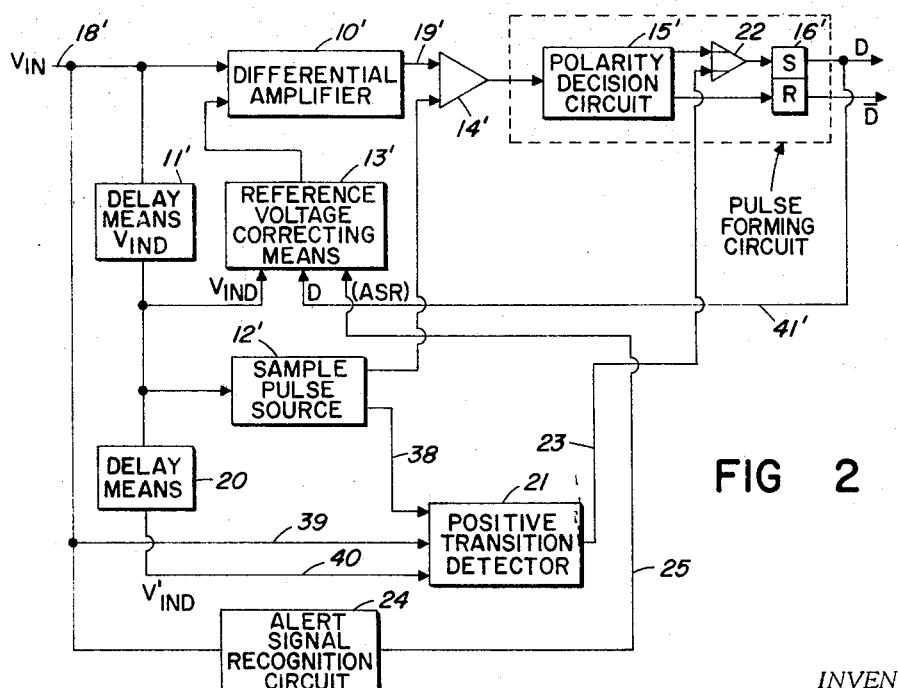
FIG. 2 is a block diagram of a more complete form of the invention, including the means for detecting a positive transition of the input signal from a lower level to an upper level.

Referring now to FIG. 2, there is shown a more complete block diagram. More specifically, in FIG. 2 an override function has been added. The override function provides a safeguard in the event that the reference voltage should ever become greater than the higher level of the input signal and includes delay means 20, positive transition detector 21, and OR gate 22.

The basic problem is as follows. It is possible, due to a sudden decrease in the average level of the input signal $V_{in}$, for the upper level thereof to become less than the amplitude of the reference signal. Under such conditions, with the circuit of FIG. 1 without the override feature, both the upper and the lower levels will appear to be "0's" and the reference signal will be corrected in an ever increasing magnitude in response to both the upper and lower levels, thus constituting a hung-up condition. To correct such hung-up condition, there is provided delay means 20, the positive transition detector circuit 21, and OR gate 22. Each time the level of the input signal increases by more than a predetermined percentage of its former value, as for example 80% of its former value, the positive transition detector 21 will function to produce an output signal which will pass through OR gate 22 and set flip-flop 16' so that a "1" appears on True output lead D, even though at that time the level of the received signal is less than the amplitude of the reference voltage.

Figure 5:
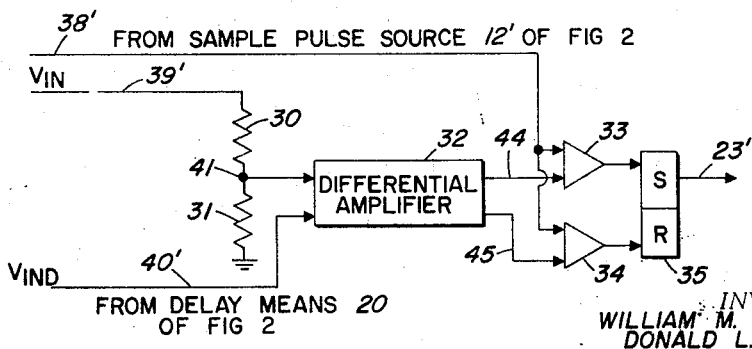
FIG. 5 is a detailed block diagram of a circuit for detecting positive transitions of the input signal which exceed the immediately preceding value of the input signal by a predetermined minimum percentage increase.
Figure 6:
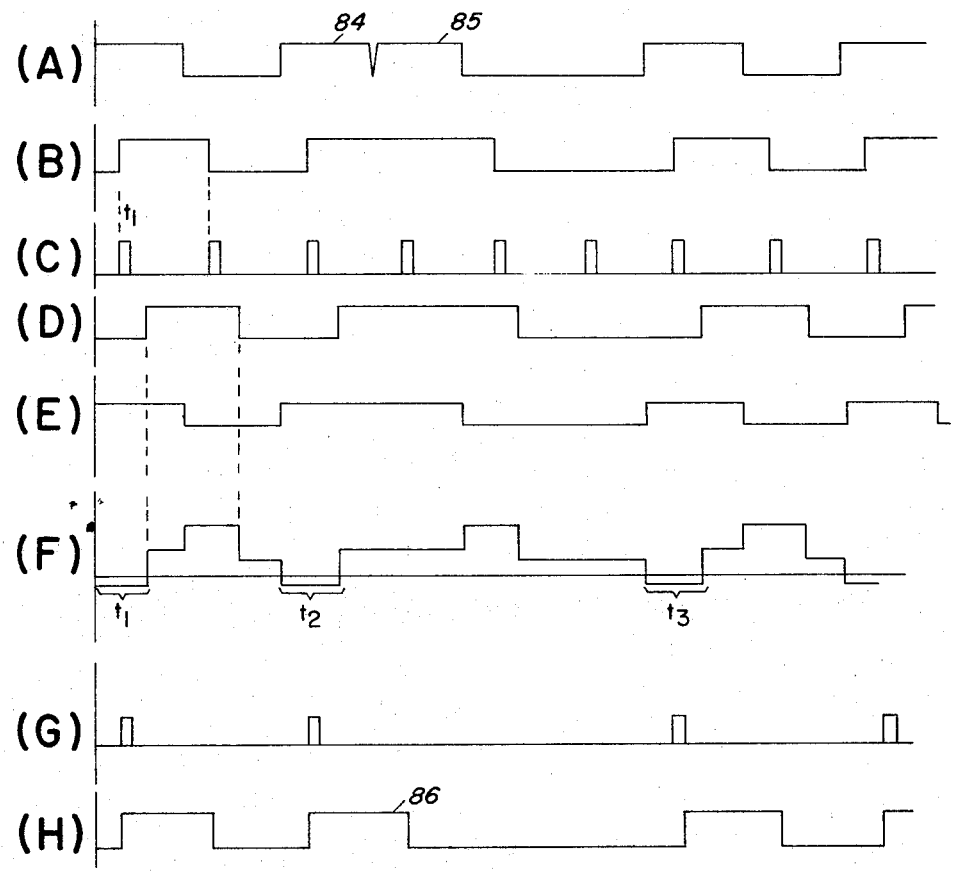
FIG. 6 is a series of voltage waveforms appearing at various points in the circuit of FIGS. 1, 2, 3, 4, and 5.

To understand more fully the function of the transition detector means reference is made to the circuit of FIG. 5 and to the waveforms of FIG. 6. The three inputs 38', 39', and 40' of FIG. 5 correspond to the three inputs 38, 39, and 40 of FIG. 2 and supply signals respectively from sample pulse source 12' of FIG. 2, input terminal 18', and the delay means 20. The delayed signal appearing on input lead 40' is shown in waveform 6D. It can be seen that the sampling pulses of waveform 6G occur during the interval of time between the beginning of a bit of the undelayed waveform of FIG. 6A and the beginning of the corresponding bit of the delayed waveform of FIG. 6D, which represents the output of delay means 20. Thus the sampling pulse supplied to AND gates 33 and 34 through input lead 38' of FIG. 5 will sample the output of the differential amplifier 32 at the time that the currently received bit is co-existent with the delayed preceding bit, as at time $T_1$ in FIG. 6C, for example.

The received delayed input signal $V_{ind}$ appearing on input lead 39' of FIG. 5 passes through a voltage divider circuit comprised of resistors 30 and 31. The values of resistors 30 and 31 are such that the input signal is attenuated by a factor of ⅗. For example, if the upper level of the received two-level input signal is two volts and the lower level is one volt, then the attenuation circuit consisting of resistors 30 and 31 will cause the two-volt level to be reduced to a value of 1.2 volts and the lower level to be reduced to the value of .6 volts.

It will thus be seen that the only intervals of time when the amplitude of the attenuated undelayed signal $V_{in}$ at tap 41 is greater than the amplitude of the delayed signal $V_{ind}$ on input lead 40' occurs when the attenuated signal has a value of 1.2 volts and the delayed signal has a value of 1 volt.

Referring to the waveform of FIG. 6F, it can be seen that such an even occurs during the time periods $T_1$, $T_2$, and $T_3$.

During such time periods the upper output terminal 44 of differential amplifier 32 will have a "1" thereon, thus conditioning AND gate 33 for conductivity upon the occurrence of a sampling pulse on input lead 38'. Upon the occurrence of said sampling pulse, the flip-flop circuit 35 will be caused to assume its set condition whereby a "1" will occur on output lead 23'.

As can be seen from FIG. 2, the output lead 23 from positive transition detector 21 passes through OR gate 22 to set flip-flop 16', thereby producing a "1" on the D output terminal thereof.

It will be observed that such a "1" will occur on the output terminal D of flip-flop 16' even though the amplitude of the reference voltage $V_{ref}$ is in fact greater than the upper level of the received input signal. Thus, it can be seen that only when the attenuated form of the received input signal appearing at point 41 is greater than the delayed waveform appearing on input lead 40' will the override function occur; i.e., a "1" will appear on the output D of flip-flop 16'. It is also to be noted that the only time such a condition can exist is when the received input signal is at least 80% greater in magnitude than the previous bit level.

The waveform of 6H shows the output of flip-flop circuit 16' of FIG. 2 during the time that the reference voltage is hung up, i.e., during the time the reference voltage is erroneously higher than both the upper and the lower levels of input signal $V_{in}$. It will be observed that since the positive transition detector circuit 21 functions only to detect an increase in voltage from a lower to an upper level, the output of flip-flop circuit 16' is not completely accurate. More specifically, the output of flip-flop 16' is not accurate in those instances where two or more successive upper levels occur in succession. Thus, in the waveform of FIG. 6A it will be seen that the two upper levels 84 and 85, which occur successively, are not reflected in the output of flip-flop 16 when the reference voltage is greater than said upper leevls. Only the bit 84 of FIG. 6A is reflected in FIG. 6H as bit 86. The bit 85 of FIG. 6A does not appear in the output of flip-flop 16'.

It is to be understood that the forms of the invention shown and described herein are but preferred embodiments thereof and that various changes may be made in circuit arrangement and in design details without departing from the spirit or scope thereof.

We claim:
1. In a communication system including a reeciver for receiving and decoding a two-level input signal by means of comparison with a reference signal whose amplitude lies between said two levels, and in which said two-level signal is composed of frames, an AM detector means comprising:

signal comparing means responsive to said input signal and to said reference voltage to produce a first output signal indicative of the larger of the input signal and the reference voltage;

means for reproducing said input signal a time interval less than a frame period after the occurrence of the unreproduced input signal; and sampling signal generating means for generating a sampling pulse near the beginning of each frame of said reproduced input signal;

said signal comparing means comprising gating means responsive to said sampling pulse and said first output signal to produce a second output signal indicative of level of the reproduced input signal;

reference voltage correcting means responsive to said reproduced input signal and said second output signal to generate and continuously correct said reference voltage amplitude to a predetermined position with reference to the two levels of said input signal.

2. A communication system in accordance with claim 1 in which said voltage reference correcting means comprises:

a closed loop circuit comprising:
voltage comparing means having first and second input means;
integrating circuit means responsive to the output of said voltage comparing means;
and load means for coupling the output of said integrating means to the first input means of said voltage comparing means;
means for supplying said reproduced input signal to the other input terminal of said voltage comparing means;

the parameters of said closed loop circuit being selected to have the voltage supplied from said load means to said first input means of said voltage comparing means equal to a common level which bears a fixed ratio to the low level of the reproduced input signal supplied to said second input means of said voltage comparing means, when the average value of said input signal remains constant;

means for changing the input impedance of said second input means in response to said second output voltage means during reception of a high level portion of said reproduced input signal to decrease said high level value to said common level;

and means for deriving said reference voltage from the voltage appearing across said load means.

3. In a communication system, an AM detector in accordance with claim 2 and further comprising:

signal amplitude change detecting means for detecting an increase in amplitude, in excess of a predetermined ratio, of any given frame level over the preceding frame level.

4. In a communication system, an AM detector in accordance with claim 3 in which said signal amplitude change detecting means comprises:

voltage divider means for dividing the amplitude of the received input signal by a factor which reduces the upper level of said input signal to a value slightly greater than the lower level of said reproduced input signal;

means for comparing the amplitudes of the reduced input signal and the said reproduced input signal to produce a third output signal each time said reduced signal exceeds said reproduced signal;

and gating means responsive to said third output signal to override said second output signal and to provide to said reference voltage correcting means a signal indicating the reception of an upper level.

5. In a communication system an AM detector in accordance with claim 1 in which said reference voltage correcting means comprises:

first amplifier means for modifying received low level portions of said reproduced input signal to a common amplitude voltage level;

second amplifier means for modifying received high level portions of said reproduced input signal to said common amplitude voltage level;

first switching means responsive to said second output signal to supply said reproduced input signal to said first or second amplifier means in accordance with the level of input signal currently being received;

integrating means for gradually changing said common amplitude voltage in accordance with changes in the average intensity of said input signal; and means for deriving said reference voltage from said common amplitude voltage.

6. In a communication system, an AM detector in accordance with claim 5 and further comprising:

signal amplitude change detecting means for detecting an increase in amplitude, in excess of a predetermined ratio, of any given frame level over the preceding frame level.

7. In a communication system, an AM detector in accordance with claim 6 in which said signal amplitude change detecting means comprises:

voltage divider means for dividing the amplitude of the received input signal by a factor which reduces the upper level of said input signal to a value slightly greater than the lower level of said reproduced input signal;

means for comparing the amplitudes of the reduced input signal and the said reproduced input signal to produce a third output signal each time said reduced signal exceeds said reproduced signal;

and gating means responsive to said third output signal to override said second output signal and to provide to said reference voltage correcting means a signal indicating the reception of an upper level.

8. In a communication system in accordance with claim 7 a means of transmitting an alert signal code immediately preceding transmission of the two level information-containing input signal, with said alert signal code comprising a train of pulses all having a level equal to a predetermined level of said two-level signal and of predetermined length, and in which:

said receiver comprises an alert signal recognition circuit constructed to respond to said alert signal code to produce an output signal;

and in which said reference voltage correcting means is constructed to respond to the output signal of said alert signal recognition circuit to initially create and preset the magnitude of said reference voltage to its nominal value;

said reference voltage correcting means comprising control means responsive to the output signal of said alert signal recognition circuit for decreasing the time constant of said integrating means to provide for a more rapid adjustment of said reference voltage than occurs during the reception of the following information containing signal.

9. In a communication system including a receiver for receiving and decoding a two-level input signal by means of comparison of said two levels with a reference voltage whose amplitude lies between said two levels and in which said two-level signal is composed of frames, an AM detector means comprising:

voltage amplitude comparing means for comparing the relative amplitudes of said input signal and said reference voltage to produce a first output signal indicative of the relative levels of said reference signal and said input signal during any given frame period;

a reference voltage generating means responsive to said received input signal and to said first output signal to determine the level of the frame being received and to continuously generate a reference voltage whose amplitude varies as the average amplitude of the received two-level input signal.

10. In a communication system in accordance with claim 9 in which said reference voltage generating means comprises:

means for reproducing said input signal at a time interval less than a frame period after the occurrence of the unreproduced signal; and sampling signal generating means for generating a sampling pulse near the beginning of each frame of said reproduced input signal;

said voltage amplitude comparing means comprising gating means responsive to said sampling pulse for initiating said first output signal during any data frame;

reference voltage correcting means responsive to said reproduced input signal and said first output signal to generate and continuously correct the amplitude of said reference voltage to a predetermined level with respect to the two levels of said input signals.

11. In a communication system an AM detector in accordance with claim 9 in which said reference voltage generating means comprises:

means for reproducing said input signal at a time interval less than a frame period after the occurrence of the unreproduced input signal;

first amplifier means for amplifying received low level portions of said reproduced input signal to a common amplitude voltage level;

second amplifier means for amplifying received high level portions of said reproduced input signal to said common amplitude voltage level;

first switching means responsive to said first output signal to supply said reproduced input signal to said first or second amplifier means in accordance with the level of input signal currently being received;

integrating means for gradually changing said common amplitude voltage level in accordance with changes in the average intensity of said input signal; and means for deriving said reference voltage directly from said common amplitude voltage.

12. In a communication system, an AM detector in accordance with claim 11 and further comprising:

signal amplitude change detecting means for detecting an increase in amplitude, in excess of a predetermined ratio, of any given frame level over the preceding frame level.

13. In a communication system, an AM detector in accordance with claim 12 in which said signal amplitude change detecting means comprises:

voltage divider means for dividing the amplitude of the received input signal by a factor which reduces the upper level of said input signal to a value slightly greater than the lower level of said reproduced input signal;

means for comparing the amplitudes of the reduced input signal and the said reproduced input signal to produce a second output signal in response each time said reduced signal exceeds said reproduced signal;

and gating means responsive to said second output signal to override said first output signal and to provide to said reference voltage generating means a signal indicating the reception of an upper level.

14. In a communication system in accordance with claim 13 a means of transmitting an alert signal code immediately preceding transmission of the two-level information containing input signal, with said alert signal code comprising a train of pulses all having a level equal to a predetermined level of said two-level signal and of predetermined length;

and in which said receiver comprises an alert signal recognition circuit constructed to respond to said alert signal code to produce an output signal;

and in which said reference voltage generating means is constructed to respond to the output signal of said alert signal recognition circuit to initially create and preset the magnitude of said reference voltage to its nominal value;

said reference generating means comprising control means responsive to the output of said alert signal recognition circuit for decreasing the time constant of said integrating means to provide for a more rapid adjustment of said reference voltage than occurs during the reception of the following information containing signal.

15. A communication system in accordance with claim 9 in which said reference voltage generating means comprises:

a closed loop circuit comprising:

voltage comparing means having first and second input means;

integrating circuit means responsive to the output of said voltage comparing means;

and load means for coupling the output of said integrating means to the first input means of said voltage comparing means;

means for supplying the input signal to the other input terminal of said voltage comparing means;

the parameters of said closed loop circuit being selected to have the voltage supplied from said load means of said first input means of said voltage comparing means equal to a common level which bears a fixed ratio to the low level of the input signal supplied to said second input means of said voltage comparing means, when the average value of said input signal remains constant;

means for changing the input impedance of said second input means in response to the said first output signal during reception of said input signal to change said high and low levels of said input signal to said common level;

and means for deriving said reference voltage from the voltage appearing across said load means.

16. In a communication system, an AM detector in accordance with claim 15 and further comprising:

means for delaying said input signal a time interval less than a frame period of said input signal;

signal amplitude change detecting means for detecting an increase in amplitude, in excess of a predetermined ratio, of any given frame level over the preceding frame level.

17. In a communication system, an AM detector in accordance with claim 16 in which said signal amplitude change detecting means comprises:

voltage divider means for dividing the amplitude of the received input signal by a factor which reduces the upper level of said input signal to a value slightly greater than the lower level of said delayed input signal;

means for comparing the amplitudes of the reduced input signal and the said delayed input signal to produce a second output signal after each time said reduced signal exceeds said delayed signal;

and gating means responsive to said second output signal to override said first output signal and to provide to said reference voltage generating means a signal indicating the reception of an upper level.

18. In a communication system including a receiver for receiving and decoding a two-level received input signal, means for generating a reference voltage $V_{ref}$ whose magnitude varies with the average intensity of the received two-level signal to remain substantially midway between said two levels, and comprising:

signal comparing means responsive to said received input signal and to said reference voltage to produce a first output signal whose polarity is indicative of the larger amplitude of said input signal and said reference voltage;

first delay means for delaying said received input signal;

sampling pulse means for generating a train of sampling pulses having a repetition rate equal to the bit rate of said received signal and occurring near the beginning of the bit frames of the delayed input signal;

said signal comparing means further comprising gating means responsive to said sampling pulses and said first output signal to produce a second output signal;

voltage reference correcting means responsive to said delayed received input signal and said second output signal to correct said reference voltage towards a new value in accordance with the average intensity of said two-level received signal.

19. A communication system in accordance with claim 18 in which said voltage reference correcting means comprises:

a closed loop circuit comprising:

voltage comparing means having first and second input means;

integrating circuit means responsive to the output of said two-level received signal.

and load means for coupling the output of said integrating means to the first input means of said voltage comparing means;

means for supplying said delayed input signal to the other input terminal of said voltage comparing means;

the parameters of said closed loop circuit being selected to have the voltage supplied from said load means to said first input means of said voltage comparing means equal to a common level whicn bears a fixed ratio to the low level of the delayed input signal supplied to said second input means of said voltage comparing means, when the average value of said input signal remains constant;

means for changing the input impedance of said second input means in response to said second output voltage means during reception of said delayed input signal to change said high and low levels of said input signal to said common level;

and means for deriving said reference voltage from the voltage appearing across said load means.

20. In a communication system, reference voltage generating means in accordance with claim 18 in which said reference voltage correcting means comprises:

first amplifier means for amplifying received low level portions of said delayed input signal to a common aplitude voltage level;

second amplifier means for amplifying received high level portions of said delayed input signal to said common amplitude voltage level;

first switching means responsive to said second output signal to supply said delayed input signal to said first or second amplifier means in accordance with the level of input signal currently being received;

integrating means for gradually changing said common amplitude voltage level in accordance with changes in the average intensity of said received input signal; and means for deriving said reference voltage directly from said common amplitude voltage level.

References Cited

UNITED STATES PATENTS

| 3,334,298 | 8/1967 | Monrad-Krohn | 328—135 |
| 3,372,234 | 3/1968 | Bowsher et al. | 178—88 |
| 3,409,834 | 11/1968 | Cullis et al. | 325—326 X |

ROBERT L. GRIFFIN, Primary Examiner

B. V. SAFOUREK, Assistant Examiner

U.S. Cl. X.R.

325—326; 328—135

UNITED STATES PATENT OFFICE
CERTIFICATE OF CORRECTION

Patent No. 3,509,279                                              April 28, 1970

Donald L. Martin et al.

It is certified that error appears in the above identified patent and that said Letters Patent are hereby corrected as shown below:

Column 4, line 1, after "flip-flop" insert -- 16 --. Column 7, line 65, "even" should read -- event --. Column 12, line 62, cancel "of said two-level received signal" and insert -- of said voltage comparing means; --.

Signed and sealed this 29th day of December 1970.

(SEAL)
Attest:

Edward M. Fletcher, Jr.                          WILLIAM E. SCHUYLER, JR.
Attesting Officer                                       Commissioner of Patents